US012560755B2

(12) United States Patent
Neumann et al.

(10) Patent No.: US 12,560,755 B2
(45) Date of Patent: Feb. 24, 2026

(54) MICROSTRUCTURED OPTICAL FIBER AND PREFORM FOR SAME HAVING SPECIFIC OXYGEN DEFICIENCY CENTER AND CHLORINE CONCENTRATIONS

(71) Applicant: Heraeus Quarzglas GmbH & Co. KG, Hanau (DE)

(72) Inventors: Christian Neumann, Hanau (DE);
Manuel Rosenberger, Hanau (DE);
Kay Schuster, Bitterfeld (DE);
Jaqueline Plass, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 248 days.

(21) Appl. No.: 18/261,391

(22) PCT Filed: Dec. 9, 2021

(86) PCT No.: PCT/EP2021/084952
§ 371 (c)(1),
(2) Date: Jul. 13, 2023

(87) PCT Pub. No.: WO2022/156956
PCT Pub. Date: Jul. 28, 2022

(65) Prior Publication Data
US 2024/0069272 A1       Feb. 29, 2024

(30) Foreign Application Priority Data
Jan. 19, 2021    (EP) ..................................... 21152296

(51) Int. Cl.
G02B 6/02 (2006.01)
C03B 37/012 (2006.01)
(Continued)

(52) U.S. Cl.
CPC ...... G02B 6/02338 (2013.01); C03B 37/0122 (2013.01); C03B 37/0146 (2013.01);
(Continued)

(58) Field of Classification Search
CPC ............ G02B 6/02338; G02B 6/02328; G02B 6/02295; C03B 37/0122; C03B 37/0146;
(Continued)

(56) References Cited

U.S. PATENT DOCUMENTS

| | | | |
|---|---|---|---|
| 6,895,155 B2 | 5/2005 | Gasca et al. | |
| 7,366,388 B2 | 4/2008 | Roberts et al. | |

(Continued)

FOREIGN PATENT DOCUMENTS

| | | | |
|---|---|---|---|
| DE | 102011121153 B3 | 3/2013 | |
| EP | 0483477 B1 | 11/1994 | |

(Continued)

OTHER PUBLICATIONS

Bradley et al., "Record Low-Loss 1.3dB/km Data Transmitting Antiresonant Hollow Core Fibre," ECOC PDP, 3 pages (2018).
(Continued)

*Primary Examiner* — Andrew Jordan
(74) *Attorney, Agent, or Firm* — Panitch Schwarze Belisario & Nadel LLP

(57) ABSTRACT

The invention relates to microstructured optical fibers that are drawn through hollow channels and have a core region, which extends along a fiber longitudinal axis, and a jacket region surrounding the core region. The aim of the invention is to reduce a damping increase due to corrosion and to reduce the emission of chlorine on the basis of the microstructured optical fibers. This is achieved in that at least some of the hollow channels are delimited by a wall material made of synthetic quartz glass which has a chlorine con-
(Continued)

Figure 1:
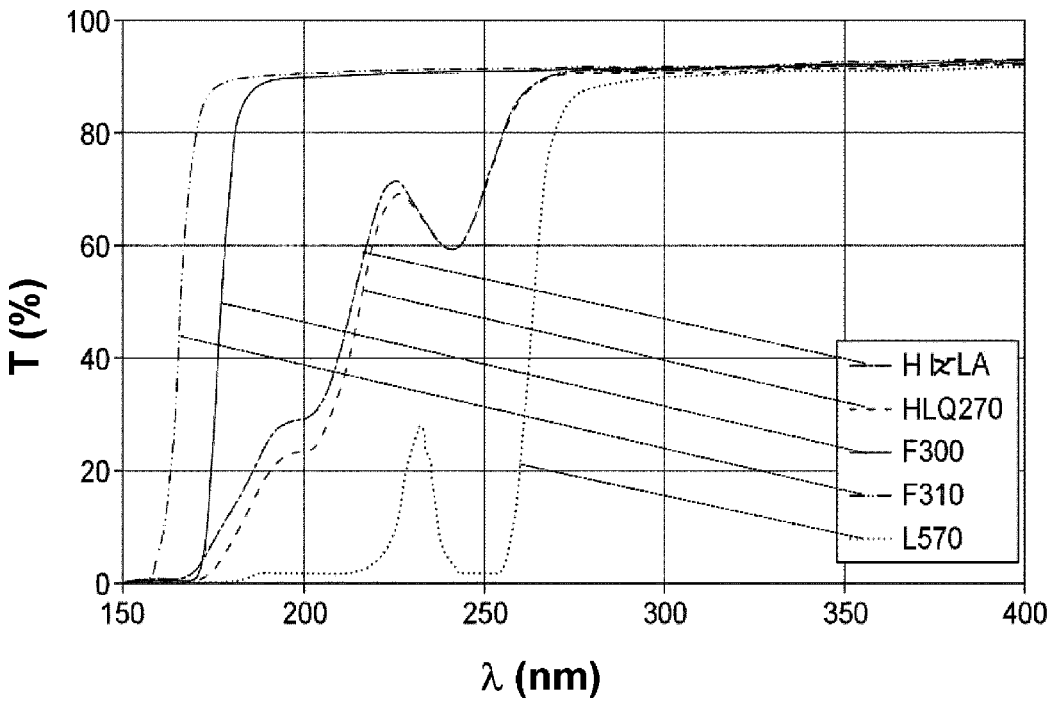

centration of less than 300 wt. ppm and oxygen deficiency centers in a concentration of at least $2 \times 10^{15}$ cm-3.

12 Claims, 2 Drawing Sheets

(51) Int. Cl.
*C03B 37/014* (2006.01)
*C03C 13/04* (2006.01)

(52) U.S. Cl.
CPC ........ *C03C 13/046* (2013.01); *G02B 6/02328* (2013.01); *C03B 2201/075* (2013.01); *C03B 2201/08* (2013.01); *C03B 2203/16* (2013.01); *C03B 2203/42* (2013.01); *C03C 2213/04* (2013.01)

(58) Field of Classification Search
CPC ........ C03B 37/01446; C03B 37/01453; C03B 2201/075; C03B 2203/16; C03B 2203/42; C03B 2203/14; C03C 13/046; C03C 2213/04
See application file for complete search history.

(56) References Cited

U.S. PATENT DOCUMENTS

| | | | | |
|---|---|---|---|---|
| 11,053,152 | B2 * | 7/2021 | Otter | C03B 20/00 |
| 11,952,303 | B2 * | 4/2024 | Whippey | C03B 19/108 |
| 2010/0266251 | A1 | 10/2010 | Lyngsoe et al. | |
| 2017/0160467 | A1 | 6/2017 | Poletti et al. | |
| 2018/0267235 | A1 | 9/2018 | Russell et al. | |
| 2019/0031554 | A1 * | 1/2019 | Otter | C03B 5/06 |
| 2019/0062194 | A1 * | 2/2019 | Otter | G02B 6/02042 |
| 2019/0077672 | A1 * | 3/2019 | Otter | C03C 1/022 |
| 2019/0077691 | A1 * | 3/2019 | Otter | C01B 33/18 |
| 2019/0119141 | A1 * | 4/2019 | Whippey | B01J 2/04 |
| 2019/0152827 | A1 * | 5/2019 | Otter | C01B 33/12 |
| 2022/0373733 | A1 * | 11/2022 | Lyngsø | C03C 13/045 |
| 2024/0069272 | A1 * | 2/2024 | Neumann | C03B 37/0146 |

FOREIGN PATENT DOCUMENTS

| | | | |
|---|---|---|---|
| EP | 1580170 | A1 | 9/2005 |
| EP | 3047319 | A2 | 7/2016 |
| NL | 2021928 | A | 11/2018 |
| WO | 2013010896 | A2 | 1/2013 |
| WO | 2015040189 | A2 | 3/2015 |
| WO | 2015185761 | A1 | 12/2015 |
| WO | 2018/237048 | A1 | 12/2018 |
| WO | 2019053412 | A1 | 3/2019 |
| WO | 2020/070488 | A1 | 4/2020 |
| WO | 2020083624 | A1 | 4/2020 |

OTHER PUBLICATIONS

Bufetov et al., "Revolver Hollow Core Optical Fibers," Fibers, vol. 6, No. 39, pp. 1-26 (2018).
Jasion et al., "Hollow Core NANF with 0.28 dB/km attenuation in the C and L Bands," OFC PDP, 3 pages (2020).
Knight et al., "Anti-Resonant Hollow Core Fibers," OFC Proceedings, 3 pages (2019).
Poletti, F., "Nested antiresonant nodeless hollow core fiber," Optics Express, vol. 22, No. 20, pp. 23807-23828 (2014).
Skuja, L., "Optical Properties of Defects in Silica," NATO Science Series II, vol. 2, pp. 73-116 (2000).
Yu et al., "Low loss silica hollow core fibers for 3-4 µm spectral region," Optics Express, vol. 20, No. 10, pp. 11153-11158 (2012).
Examination Report issued Dec. 12, 2025 in IN Application No. 202317041207.

* cited by examiner

MICROSTRUCTURED OPTICAL FIBER AND PREFORM FOR SAME HAVING SPECIFIC OXYGEN DEFICIENCY CENTER AND CHLORINE CONCENTRATIONS

TECHNICAL BACKGROUND

The invention is in the field of microstructured optical fibers, especially in that of hollow core fibers.

In addition, the invention relates to a preform for producing a microstructured optical fiber.

Microstructured optical fibers have a solid or hollow core region extending along a longitudinal axis of the fiber and an inner cladding region which surrounds the core region and through which hollow channels extend. These fibers are also referred to as photonic crystal fibers (PCF). These include, for example, "photonic band gap fibers" and "anti-resonance reflection fibers."

In the case of "photonic bandgap fibers," the core region is surrounded by a cladding in which small hollow channels are periodically arranged. Due to Bragg reflection on the glass/air boundary surfaces, the periodic structure of the hollow channels in the cladding causes a constructive interference of the reflected radiation components and a destructive interference of the transmitted (transverse) components. The standing wave in the core produced thereby reduces the transport of energy in a transverse direction so that waves are guided in the direction of the fiber longitudinal axis. However, these interference effects yield positive conduction properties only within a limited wavelength range which, borrowing from semiconductor technology, is referred to as a "photonic band gap."

In the embodiment of the hollow-core fiber referred to as "anti-resonant hollow-core fiber" (ARHCF), the hollow core region is surrounded by an inner cladding region in which so-called "anti-resonant elements" (or "anti-resonance elements," "AREs" for short) are arranged. The walls of the anti-resonance elements evenly distributed around the hollow core can act as Fabry-Perot cavities operated in anti-resonance which reflect the incident light and guide it through the hollow fiber core.

Potential applications of the microstructured optical fibers lie in the fields of data transmission, high-power beam guidance, for example for material processing, modal filtering, non-linear optics, in particular for super-continuum generation, from the ultraviolet to infrared wavelength range.

Hollow core fibers also enable precision spectroscopy investigations of media (gases or liquids) located in the hollow core. Since the light guided in the core largely overlaps the medium to be examined, concentrations in the ppm range can also be detected. In addition, use in optical atomic clocks, quantum computers and fluorescence microscopy is also possible.

PRIOR ART

The microstructured optical fibers frequently consist at least in part of synthetic quartz glass. For production-related reasons, this can contain hydroxyl groups (OH groups for short) which have an effect on optical damping, in particular in the wavelength range from about 800 nm to 3000 nm.

To produce low-loss quartz glass which contains as few hydroxyl groups as possible (1 ppm by weight or less), the production process frequently includes a dehydration treatment using halogens, in particular chlorine. Furthermore, fluorine and chlorine are common dopants for influencing the refractive index and the viscosity of quartz glass. Typically, synthetically produced quartz glass having a low OH content therefore has a relatively high halogen content.

Depending on the production route, the halogens can be chemically bound or physically dissolved in the network structure of the quartz glass. The type of incorporation has an influence on so-called waste gas processes. Halogen loading and outgassing can lead to problems with fiber insertion; for example to the formation of disruptive absorption bands, bubble formation in the glass during hot processing, and deposits or changes in the pH of media to be investigated which are in contact with the fiber.

For example, US 2010/266251 A1 describes that, in a microstructured optical fiber drawn from a preform of chlorine-containing quartz glass, degradation of the fiber end face can occur. The degradation is attributed to the fact that chlorine diffusing out of the quartz glass passes through a hollow channel to the fiber end face and forms deposits or corrosive substances there by reaction with water or ammonia from the environment. It is recommended to reduce the outward diffusion of chlorine by forming at least parts of the preform of quartz glass with a chlorine concentration of less than 300 ppm. The chlorine content can be reduced, for example, by heating the preform. Alternatively, a diffusion barrier made of quartz glass is provided which adjoins the hollow channel and reduces the diffusion of chlorine into the hollow channel.

Furthermore, in production and when using the fibers, impurities (gases, moisture, etc.) can enter into the hollow channels through outgassing, but also by entering via open fiber ends, and have an unfavorable effect on the fiber properties. Each trace of moisture not only yields an increase in the damping in the wavelength range around 1380 nm, but can also lead to surface corrosion on the inner and outer fiber surfaces. For example, water can break Si—O—Si or Si—Cl bonds of the network structure, and surface-bound Si—OH species and HCl can arise.

For protection against corrosion, the fiber outer cladding is therefore generally provided with a polymer coating. WO 2020/070488 A1 describes a microstructured optical fiber for diagnostic purposes in which, in addition to protection against water entering the coating, the fiber is arranged in a tube which is filled with a water-blocking filler material.

From WO 2018/237048 A1, a high-power cable is known with an anti-resonant hollow core fiber in which the open fiber ends are covered with protective caps for preventing water from entering that have a window with a nanostructured surface to reduce reflection losses.

Synthetic quartz glass containing oxygen defect centers for use as cladding material of an optical fiber is known from DE 10 21011 121 153 B1.

Technical Object

With the generic microstructured optical fiber known from US 2010/266251 A1, commercially available quartz glass grades are specified as the material for the diffusion barrier (trade name F100 or F110 from Heraeus Quarzglas GmbH & Co. KG), which have a moderate chlorine content of less than 300 ppm by weight. However, the hydroxyl group content of these quartz glass grades is at least 400 ppm by weight. In this respect, a higher hydroxyl group content and the associated damping losses are accepted in trade for a low-halogen quartz glass.

The agents that can be applied to protect against corrosion on the fiber outer cladding cannot be used on the inner surfaces of the hollow fiber channels. In hollow core fibers, corrosion produces a gradual increase in damping. End caps for protecting against water ingress lead to transmission losses.

The aim of the invention is therefore to reduce the corrosion-related increase in damping and the outgassing of chlorine in a microstructured optical fiber, in particular a hollow-core fiber.

Furthermore, the object of the invention is to provide a preform suitable for producing such a microstructured optical fiber.

SUMMARY OF THE INVENTION

With regard to the microstructured optical fiber, this object is achieved according to the invention starting from a fiber with the features mentioned at the outset in that at least some of the hollow channels are delimited by a wall material of synthetic quartz glass which has a chlorine concentration of less than 300 ppm by weight and oxygen deficiency centers at a concentration of at least $2 \times 10^{15}$ cm$^{-3}$.

The wall material, which borders at least some of the hollow channels of the microstructured optical fiber and preferably borders all hollow channels of the fiber, consists of synthetic quartz glass. This is chlorine-free or has a low chlorine concentration of less than 300 ppm by weight, preferably less than 30 ppm by weight, more preferably less than 3 ppm by weight.

The technical problems described at the onset which can be accompanied by the outgassing and chemical reaction of chlorine, are therefore prevented or minimized.

Moreover, the synthetic quartz glass has a substoichiometric oxygen content. This is reflected by the fact that the network structure has oxygen deficiency centers in which oxygen points of the network are unoccupied, or are occupied by other atoms. Known types of oxygen deficiency centers are:

(1) a triply coordinated silicon atom with a paramagnetic electron (E' center) having an absorption maximum at a wavelength of 210 nm, wherein one or two electrons may have linked to the unsaturated bonds of the network structure.

(2) oxygen deficiency centers (ODC) of which two types are distinguished that are in equilibrium with each other, referred to in the literature as ODC I and ODC II. ODC I: direct Si—Si bond with an absorption maximum at a wavelength of 163 nm (7.6 eV) and ODC II: doubly coordinated silicon atom with an absorption maximum at a wavelength of 247 nm (5.0 eV).

The concentration of these oxygen deficiency centers in quartz glass can be determined by spectroscopy using the absorption of the E' center at 210 nm, or the ODC center at 247 nm. In this case, a measure of a sufficient degree of the substoichiometry of the quartz glass overall is the spectroscopic concentration of the ODC oxygen deficiency centers determined by the absorption at a wavelength of 247 nm when this is $2 \times 10^{15}$ cm$^{-3}$ or more.

It is to be assumed that the quartz glass, which is far from its stoichiometric composition, has oxygen deficiency centers other than the two specified ones which can be determined on the basis of their specific photoluminescence without being specifically assigned to a certain defect type.

Oxygen deficiency centers in synthetic quartz glass are usually regarded as disadvantageous structural defects to be avoided if possible which can impair the optical properties. In the present invention, however, such oxygen deficiency centers are intentionally produced in a large amount in the wall material so that the latter can react actively with moisture and thereby eliminate it. The moisture remaining or formed during fiber production or when the fiber is used is, for example, in the hollow channels or any hollow core, and is, for example, adsorbed on surfaces of the preform or the fiber. It comprises both water molecules dissolved in the ambient gas and physically adsorbed water molecules. Both can react with the oxygen deficiency centers of the quartz glass wall at elevated temperatures, for example, according to the following reaction equation:

$$Si—Si+H_2O \rightarrow Si—H+Si—OH.$$

Existing moisture is therefore chemically bound and immobilized in the network structure of the quartz glass. As a result of this "drying effect" of the oxygen deficiency centers, the influence of moisture on the transmission behavior of the fiber is kept as low as possible. This has a particularly positive effect on the so-called "high field region" which designates the region of light conduction that occurs in the hollow core. There, less moisture is present because it is bound by reaction with the water-absorbing oxygen deficiency defects. Moreover, the diffusion of moisture via open fiber ends is also kinetically inhibited.

With regard to these effects, the concentration of the oxygen deficiency centers in the quartz glass is in principle as high as possible, and is in particular at least $5 \times 10^{15}$ cm$^{-3}$, better $1 \times 10^{16}$ cm$^{-3}$, and preferably at least $5 \times 10^{16}$ cm$^{-3}$.

On the other hand, oxygen deficiency centers absorb light, in particular light in the UV wavelength range; they increase the viscosity of the glass and make its processing, in particular homogenization, more difficult. The specific use of the optical waveguide therefore determines the acceptable maximum concentration. This depends, for example, on the operating wavelength, the length of the transmission path (fiber length, rod length), the light mode profile guided in the optical waveguide, the profile of the optical waveguide and the requirements for the minimum output at the optical waveguide end or for the homogeneity of the glass, also with regard to its melting and drawing behavior. Given a long-wave operating wavelength, short transmission path such as in the meter or centimeter range, and low demands on the minimum light output at the optical waveguide end and on the homogeneity of the glass, high concentrations of oxygen deficiency centers above $2 \times 10^{20}$ cm$^{-3}$ are technically feasible. Higher requirements of the above-mentioned types can, however, restrict the upper concentration upper limit to at most $2 \times 10^{20}$ cm$^{-3}$, preferably to at most $5 \times 10^{19}$ cm$^{-3}$, at most $1 \times 10^{19}$ cm$^{-3}$, at most $5 \times 10^{18}$ cm$^{-3}$, at most $2 \times 10^{18}$ cm$^{-3}$, at most $1 \times 10^{18}$ cm$^{-3}$, at most $5 \times 10^{17}$ cm$^{-3}$, at most $2 \times 10^{17}$ cm$^{-3}$ and, in the case of particularly high requirements, preferably to at most $1 \times 10^{17}$ cm$^{-3}$.

The oxygen deficiency centers can be introduced into the synthetic quartz glass by a subsequent temperature treatment in a reducing atmosphere. This results in a gradient of defect center distribution over the volume of the boundary wall with a maximum in the region of the wall surfaces, i.e., the place where the reaction with moisture should primarily take place. Alternatively, defect center generation at a high concentration and simultaneous homogeneous distribution can be achieved directly during the production of the synthetic quartz glass.

To produce synthetic quartz glass, a silicon-containing feed material is converted by hydrolysis or oxidation in a reaction zone into SiO$_2$ particles and deposited on a carrier. Examples include the so-called OVD method (outside vapor phase deposition), the VAD method (vapor phase axial deposition), or the POD method (plasma outside deposition). At a sufficiently high temperature in the region of the support surface, there is immediate vitrification of the $SiO_2$ particles, which is also known as "direct vitrification." Contrastingly in the so-called "soot process", the temperature during deposition of the $SiO_2$ particles is so low that a porous $SiO_2$ soot layer is obtained which is sintered to form transparent quartz glass in a separate process step. Both direct vitrification and the soot method ultimately result in a dense, transparent, highly pure synthetic quartz glass.

Both methods are suitable for the generation of oxygen deficiency centers by establishing conditions having a reducing effect during the deposition process. A condition "has a reducing effect" in this sense if during the formation of the $SiO_2$ particles in the reaction zone and their deposition:

(1) either a substoichiometric oxygen fraction is provided so that complete burning of the silicon compound in the reaction zone is already ruled out for stoichiometric reasons, (2) or the dwell time of the silicon compound in the reaction zone is set shorter than required for complete reaction of the feed material.

The former takes place by guiding the deposition process with such a low oxygen supply that, under the given reaction conditions, the complete burning of the silicon compound in the reaction zone is already ruled out for stoichiometric reasons.

The latter occurs, for example, because the feed material in the reaction zone is shielded from the oxygen such as by providing a separating gas stream of inert gas between the stream of feed material and an oxygen stream, or by setting an excessively short reaction zone, and/or by generating an excessively high flow rate of the feed material in the reaction zone.

In any case, a synthetic quartz glass, which is substoichiometric with respect to the oxygen content, is obtained. Measures for adjusting the desired oxygen deficiency centers due to reducing conditions in the deposition process can be checked for their suitability in a few experiments.

The soot method also offers the possibility of subsequently treating the soot body in a reducing atmosphere to generate homogeneously distributed oxygen deficiency centers. An atmosphere "has a reducing effect" in this sense when a substance is present that functions as an electron donor to silicon or $SiO_2$, for example hydrogen or hydrocarbons.

In addition to a large amount of oxygen deficiency centers, the synthetic quartz class is characterized by a low hydroxyl group content of less than 10 ppm by weight, preferably less than 1 ppm by weight.

Hydroxyl groups are suitable for saturating the existing oxygen deficiency defects and thereby reduce their drying effect.

This applies equally to halogens. Therefore, the synthetic quartz glass advantageously has a minimum halogen content of less than 20 ppm by weight, preferably less than 10 ppm by weight.

In the ideal case, the synthetic quartz glass consists exclusively of silicon and of oxygen and contains no foreign substances whatsoever. In practice, however, foreign substances are unavoidable. Foreign substances in the synthetic quartz glass can influence the drying effect of the oxygen deficiency centers. Carbon which, for example, can form from the use of an organic silicon-containing feed material as a result of reducing conditions during the deposition process or from a reducing aftertreatment of a $SiO_2$ soot body, does not have this harmful effect, nor does nitrogen, so that these substances are not subsumed under "foreign substance" in the above sense.

Metallic foreign substances are in particular alkali metals and alkaline earth metals, as well as the inner transition metals of the periodic table and the lanthanides. In quartz glass, these substances are typically present in ionic form. However, given a substoichiometric oxygen content, it is also possible to achieve reduced metallic impurities. Metallic foreign substances can cause pronounced absorptions which impair transmission.

In view of this, it has proven to be worthwhile if the quartz glass of the wall material contains foreign substances, with the exception of carbon and nitrogen, in a overall concentration of less than 30 ppm by weight, preferably less than 3 ppm by weight, and if the overall concentration of metallic foreign substances in the quartz glass is less than 1 ppm by weight, particularly preferably less than 100 ppb by weight.

It has also proven advantageous if the synthetic quartz glass has a viscosity at a temperature of 1200° C. of at least $10^{13}$ dPa s.

The higher viscosity of the wall material with oxygen deficiency centers compared to synthetic quartz glass with fewer defects has an advantageous effect on obtaining structures within the microstructured inner cladding region during the fiber drawing process, and therefore on the damping properties of the fiber. This applies in particular to delicate structures as they occur in the inner cladding region of microstructured antiresonance fibers.

In a particularly preferred embodiment of the microstructured optical fiber ("band gap fiber"), the core region has at least one hollow core, wherein the inner cladding region comprises a microstructured regular arrangement of hollow channels extending in the longitudinal direction, and wherein the inner cladding region is made of the wall material.

In another preferred embodiment of the microstructured optical fiber ("anti-resonant hollow core fiber"), the core region has at least one hollow core, wherein the inner cladding region comprises hollow structural elements extending in the direction of the longitudinal axis of the fiber which are arranged annularly on the inner lateral surface of an inner cladding, and guide the light by an anti-resonance effect along the hollow core.

The hollow structural elements in this case comprise, for example, an ARE outer capillary and at least one nested inner capillary (NE, nested element) connected to an inner lateral surface of the ARE outer capillary, wherein it has proven useful if the inner cladding, the ARE outer capillary, and/or the NE inner capillary are made of the wall material. Preferably, the inner cladding and the ARE outer capillary, or the inner cladding and the NE capillary, or the ARE outer capillary and the NE capillary, and particularly preferably both the inner cladding as well as the ARE outer capillary and the NE inner capillary, are made of the wall material containing oxygen deficiency centers. In the production of an anti-resonance hollow-core fiber, the mentioned components (in addition to possible others) are frequently combined in a component ensemble, wherein they are buffered with an outer cladding (or "buffer tube") in a collapsing and/or elongating process.

Where appropriate, the optical fiber in the form of the anti-resonant hollow core fiber also includes an outer cladding region surrounding the inner cladding region and originating from the buffer tube. In an advantageous embodiment, the buffer tube is also made from the wall material containing oxygen deficiency centers, i.e., from synthetic quartz glass with a chlorine concentration of less than 300 ppm by weight, and with oxygen deficiency centers at a concentration of at least $2\times10^{15}$ cm$^{-3}$.

The outer cladding region is generally further away from the hollow channels of the fiber than the inner cladding region. However, in particular as a result of its comparatively large mass of cladding glass, it can still contribute to drying in the region of the hollow channels.

The wall material of synthetic quartz glass with a chlorine concentration of less than 300 ppm by weight and with oxygen deficiency centers at a concentration of at least $2\times10^{15}$ cm$^{-3}$ is comparatively expensive. In another embodiment, a buffer tube is used which does not consist of this wall material, but rather of a quartz glass with a chlorine concentration of more than 300 ppm by weight and with oxygen deficiency centers at a concentration of less than $2\times10^{15}$ cm$^{-3}$.

With regard to the preform, the aforementioned technical object is achieved according to the invention in that it has a core region extending along a preform longitudinal axis and an inner cladding region surrounding the core region, and through which hollow channels run, of which at least some are bordered by a wall material made of synthetically produced quartz glass which has a chlorine concentration of less than 300 ppm by weight and oxygen deficiency centers at a concentration of at least $2\times10^{15}$ cm$^{-3}$.

The wall material, which borders at least some of the hollow channels of the preform and preferably borders all hollow channels of the preform, consists of synthetic quartz glass. This is chlorine-free or has a low chlorine concentration of less than 300 ppm by weight, preferably less than 30 ppm by weight, more preferably less than 3 ppm by weight. The problems associated with outgassing and the chemical reaction of chlorine can therefore be prevented or minimized.

Moreover, the synthetic quartz glass has a substoichiometric oxygen content. This is reflected by the fact that the network structure has oxygen deficiency centers in which oxygen points of the network are unoccupied, or are occupied by other atoms. Known types of oxygen deficiency centers are so-called E' centers and ODC centers (ODC I; ODC II), as explained in more detail above with reference to the microstructured optical fiber.

The concentration of these oxygen deficiency centers in quartz glass can be determined by spectroscopy using the absorption of the E' center at 210 nm, or the ODC center at 247 nm. In this case, a measure of a sufficient degree of the substoichiometry of the quartz glass overall is the spectroscopic concentration of the ODC oxygen deficiency centers when this is $2\times10^{15}$ cm$^{-3}$ or more determined by the absorption at a wavelength of 247 nm.

In the invention, the oxygen deficiency centers are intentionally produced in a large amount in the wall material so that the latter can react actively with moisture and thereby eliminate the moisture. The moisture created during the production of the preform or the fiber is located, for example, in the hollow channels or any hollow core, and is, for example, adsorbed on surfaces of the preform or the fiber. It can react with the oxygen deficiency centers of the quartz glass wall, for example, according to the following reaction equation:

$$Si\text{—}Si + H_2O \rightarrow Si\text{—}H + Si\text{—}OH$$

and is thereby chemically bound and immobilized in the network structure of the quartz glass. As a result of this "drying effect" of the oxygen deficiency centers, the influence of moisture on the transmission behavior of the fiber is kept as low as possible. Moreover, the diffusion of moisture via open preform ends is also kinetically inhibited.

The above explanations in connection with the microstructured optical fiber also apply to the preform and are hereby incorporated.

Measurement Methods and Definitions

Individual method steps and terms of the above description are additionally defined below. The definitions form part of the description of the invention. In the event of a substantive conflict between one of the following definitions and the remaining description, the statements made in the rest of the description prevail.

Measurement of the Oxygen Deficiency Centers

The oxygen deficiency centers in SiO$_2$ are detected spectroscopically by absorption measurements, and the concentration of the oxygen deficiency centers is calculated therefrom using a simplified Smakula equation:

The calculation method is described in: Pacchioni, G.; Skuja, L.; Griscom, D. L. (2000). Defects in SiO$_2$ and Related Dielectrics: Science and Technology‖OPTICAL PROPERTIES OF DEFECTS IN SILICA., 10.1007/978-94-010-0944-7 (Chapter 3), 73-116. doi: 10.1007/978-94-010-0944-7_3

Anti-Resonance Elements

Anti-resonance elements may be simple or nested structural elements of the hollow-core fiber. They have at least one wall that, when viewed from the direction of the hollow core, has a negative curvature (convex) or does not have a curvature (planar, straight). They generally consist of a material which is transparent to the working light, for example made of glass, in particular of doped or non-doped SiO$_2$.

Antiresonance Element Preform

What are referred to as anti-resonance element preforms are components or constituents of the preform that essentially become anti-resonance elements in the hollow-core fiber by simple elongation during the fiber-drawing process. Nested anti-resonance element preforms form nested anti-resonance elements in the hollow-core fiber. They are composed of an ARE outer tube and at least one further structural element that is arranged in the inner bore of the ARE outer tube. The further structural element can be a further tube which bears against the inner surface of the outer tube. The additional tube is referred to as a "nested element" or as an "NE inner tube" for short, or also as a "nested NE inner tube."

In the case of multi-nested anti-resonance element preforms, at least one additional structural element, for example a third tube abutting against the inner surface of the nested NE inner tube, can be arranged in the inner bore of the NE inner tube. Where there are multi-nested anti-resonance element preforms, in order to distinguish between the multiple tubes that are arranged within the ARE outer tube, a distinction can optionally be made between "outer NE inner tube" and "inner NE inner tube."

The term "cross-section" in conjunction with cylindrical anti-resonance element preforms, their cylindrical structural elements and the capillary semifinished product, always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified compared to the original shape. The modified shape is also referred to here as an antiresonance element preform.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fastened therein. The further processing of the primary preform into a secondary preform from which the hollow-core fiber is drawn can comprise a single or repeated performance of one or more of the following hot-forming processes:

(i) elongation, (ii) collapse, (iii) collapse and simultaneous elongation, (iv) collapse of additional sheath material, (v) collapse of additional sheath material and subsequent elongation, (vi) collapse of additional sheath material and simultaneous elongation.

A preform obtained by collapsing and/or elongating a primary preform is referred to in the literature as a cane which therefore falls under the definition of the secondary preform. Typically, it is overlaid with additional sheath material before or during drawing of the hollow-core fiber.

Elongating/Collapsing

During elongation, the primary preform is softened and thereby stretched. The stretching can take place without simultaneous collapse. Elongation can take place true to scale, so that, for example, the shape and arrangement of components or constituents of the primary preform is reflected in the stretched, elongated end product. During elongation, however, the primary preform can also be drawn not true to scale and its geometry can be modified.

During collapse, an inner bore is narrowed or annular gaps between tubular components are closed or narrowed. The collapse can be accompanied by an elongation.

Hollow Core/Inner Sheath Region/Outer Sheath Region

The ensemble comprising at least one cladding tube and ARE preforms loosely accommodated or firmly fastened is also referred to herein as the "primary preform." The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner surface of the tube" and the designation "outer side of the tube" is also used as a synonym for "outer surface of the tube." The term "inner bore" in conjunction with a tube does not mean that the inner bore has been produced by a drilling process.

EXEMPLARY EMBODIMENT

Figure 2:
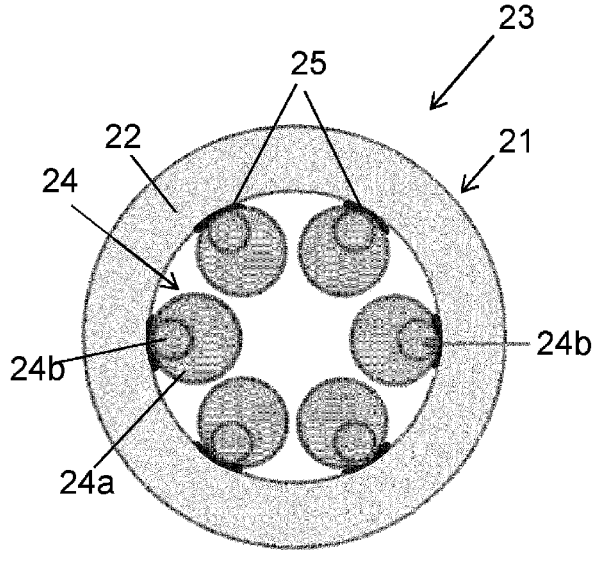
Figure 3:
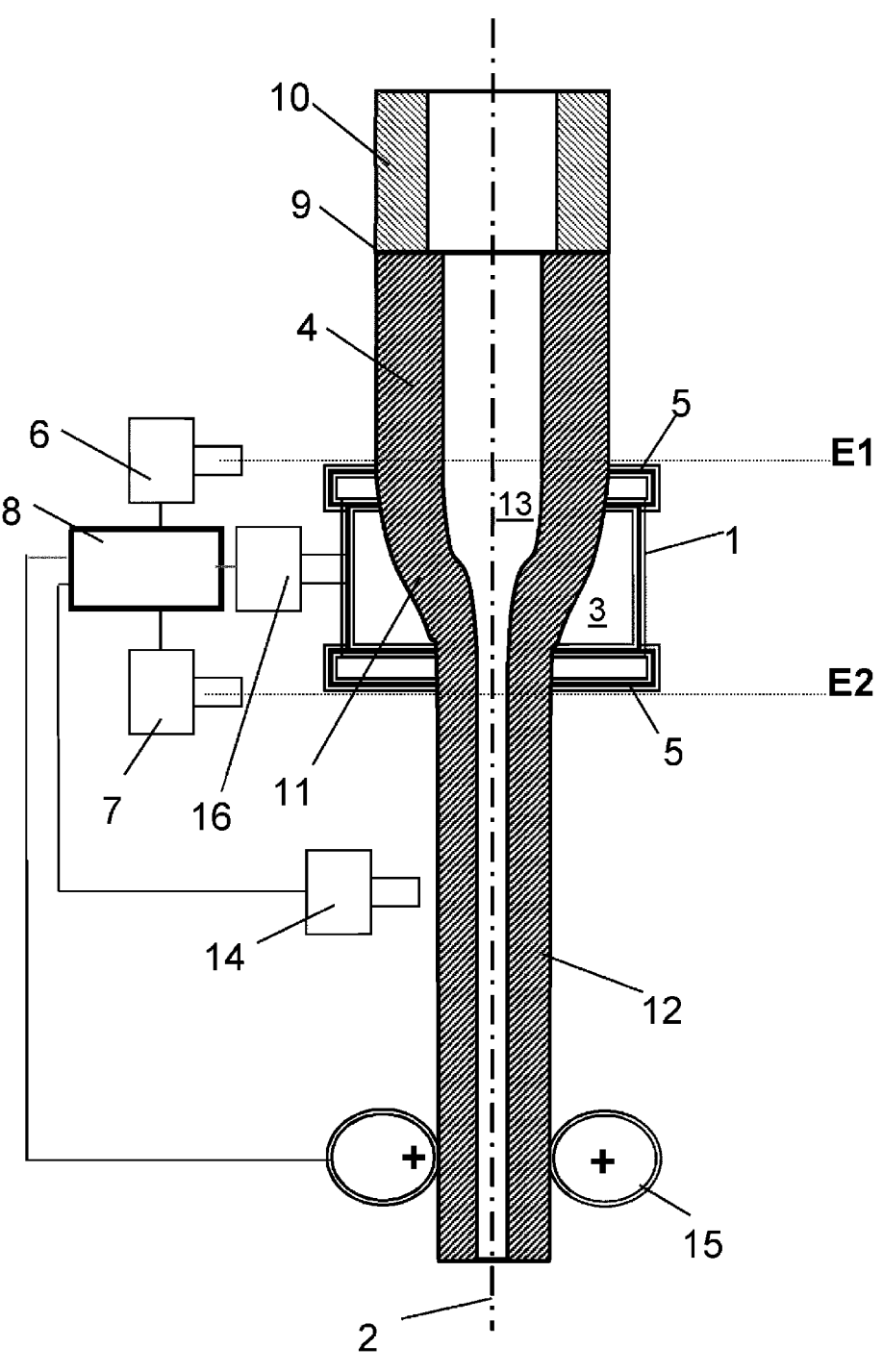

The invention is explained in more detail below with reference to an exemplary embodiment and a drawing. The following are shown in detail:

FIG. 1 a diagram with transmission spectra of various quartz glass grades,

FIG. 2 a primary preform with a cladding tube and anti-resonance element preforms positioned and fastened therein for producing a preform for a hollow-core fiber with reference a view of the radial cross-section, and FIG. 3 a device for use in the tool-free production of ARE outer tubes and ARE inner tubes by means of a vertical drawing process.

Production of Synthetic Quartz Glass with Oxygen Deficiency Centers

The quartz glass with oxygen deficiency defects is produced according to the method described in EP 1 580 170 A1. In this process, a porous $SiO_2$ soot body with an outer diameter of 100 mm and a weight of 1 kg is first prepared by flame hydrolysis of $SiCl_4$ in the usual way. This is introduced into a treatment furnace, and the furnace chamber is evacuated and heated to a temperature of 500° C. After a holding time of 60 min, hexamethyldisilazane is introduced into the furnace chamber with nitrogen as carrier gas at a rate of 1 mol/h, and the soot body is treated in this atmosphere for 3 hours.

Subsequently, the soot body treated in this way is introduced into a vacuum furnace and is first heated therein under a vacuum (0.001 mmHg) to 800° C. and after one hour to a temperature of 1600° C. and sintered to form quartz glass. In the course of the temperature treatment, a large part of the hydrogen escapes that was previously introduced into the $SiO_2$ solid body due to the manufacturing process.

A transparent, synthetic quartz glass of high purity is obtained which has a hydroxyl group content below 1 ppm by weight, a chlorine content of less than 30 ppm by weight, a carbon content of 100 ppm by weight, a nitrogen content of 80 ppm by weight, and a hydrogen content of less than $5 \times 10^{16}$ molecules/$cm^3$. The concentration of Li is less than 2 ppb by weight, and the concentration of the following metallic impurities is less than 5 ppb by weight in each case: Na, K, Mg, Al, K, Ca, Ti, Cr, Fe, Ni, Cu, Mo, W, V, and Zn. The total concentration of metallic impurities is less than 100 ppb by weight. At a temperature of 1,280° C., the quartz glass has a viscosity of 12.4 (log η).

The treatment of the porous $SiO_2$ soot body in a reducing atmosphere-due to the action of the organic, silicon-containing compound hexamethyldisilazane-leads to different oxygen deficiency centers in the synthetic quartz glass. This is shown by the fact that the quartz glass treated in this way has a high absorption at a wavelength of approximately 247 nm (see FIG. 1).

The concentration of the ODC oxygen deficiency centers that absorb at this wavelength is determined by spectroscopy and is $9.14 \times 10^{16}$ cm$^{-3}$.

The ODC oxygen deficiency centers of the quartz glass cause absorption in the UV wavelength range, such as the transmission spectra of FIG. 1. On the y-axis, the measured transmission T (in %) is plotted against the wavelength λ (in nm) over the wavelength range of 150 to approximately 400 nm. The "measured transmission" T includes reflection losses on surfaces and differs in this respect from the so-called "internal transmission" (or "pure transmission") with a sample thickness of 1 cm.

The diagram contains the transmission profile of the quartz glass, the production of which is explained above (name: L570). For comparison, additional transmission profiles of other commercially available quartz glass grades are recorded. The designations "HLQ270" and "HIx-LA" are quartz types which have been melted from naturally occurring quartz crystal. "F310" is a synthetically produced quartz glass with a low chlorine content (<0.2 ppm by weight) and a hydroxyl group content of 200 ppm by weight. And "F300" is another synthetically produced quartz glass with a low hydroxyl group content (<0.2 ppm by weight) and a chlorine content within a range of 800 to 2000 ppm by weight. The oxygen deficiency centers of the sample L570 are indicated by a pronounced transmission minimum within the wavelength range of approximately 245 to 255 nm. The two quartz glass grades of synthetic quartz glass do not exhibit absorption within this wavelength range and are accordingly unsuitable for use as a "wall material" containing oxygen deficiency centers within the meaning of this invention. Although the relative transmission minimum of quartz glass samples melted from natural raw material is indicative of a certain amount of oxygen deficiency centers, these quartz glass grades are likewise unsuitable for this use due to the intrinsic impurities.

The quartz glass grade produced in this manner and loaded with oxygen deficiency centers is used to produce a preform for an anti-resonance hollow-core fiber. In the following, the production of the preform is explained with reference to an example.

FIG. 2 schematically shows a primary preform 23 with a cladding tube 21 having a cladding tube wall 22, on the inner surface of which are fastened equidistantly spaced anti-resonance element preforms 24 at previously defined azimuthal positions; in the exemplary embodiment, there are six preforms 24; in another preferred embodiment (not shown), there is an odd number of preforms.

The inner cladding tube 21 consists of quartz glass loaded with oxygen deficiency centers and has a length of 1000 mm, an outer diameter of 27 mm and an inner diameter of 20 mm. The anti-resonance element preforms 24 are present as an ensemble of nested structural elements consisting of an ARE outer tube 24a and an ARE inner tube 24b. The ARE outer tube 24a has an outer diameter of 6.2 mm and the ARE inner tube 24b has an outer diameter of 2.5 mm. The wall thickness of both structural elements (24a; 24b) is the same and is 0.3 mm. The diameter ratio in the ARE outer tube 24a is therefore 1.107 and in the ARE inner tube it is 1.315. The lengths of ARE outer tube 24a and ARE inner tube 24b correspond to the length of the cladding tube. The ARE inner tube 24b and the ARE outer tube 24a also consist of the quartz glass loaded with oxygen deficiency centers.

The anti-resonance element preforms 24 are fixed to the inner wall of the cladding tube 21 by thermal spot-bonding using a torch. The connection points are denoted by reference numeral 25.

The anti-resonance element preforms 24 are placed using a positioning template with a structurally predetermined star-shaped arrangement of holding arms for the individual antiresonance element preforms 24. In this case, the positioning template is limited to the region around the two end-face ends of the cladding tube.

This method creates a precise and reproducible connection between the cladding tube 21 and the anti-resonance element preforms 24.

The primary preform 23 is covered with a buffer tube made of quartz glass, wherein the buffer tube collapses onto the cladding tube 21, and at the same time, the tube ensemble is elongated to form a secondary preform. The buffer tube has an outer diameter of 63.4 mm and a wall thickness of 17 mm. The buffer tube can consist of a commercially available synthetic quartz glass with no measurable concentration of oxygen deficiency centers, as in the exemplary embodiment of the synthetic quartz glass commonly used under the trade name "F300."

In the collapse and elongation process, the coaxial arrangement of the cladding tube 21 and the buffer tube coming from below in a vertically oriented longitudinal axis is fed into a temperature-controlled heating zone and softens therein zone-by-zone starting with the upper end of the arrangement.

The heating zone is kept at a desired temperature of 1600° C. with a control accuracy of +/−0.1° C. Temperature fluctuations in the hot-forming process can thereby be limited to less than +/−0.5° C.

The secondary preform formed in the collapse and elongation process has an outer diameter of approximately 50 mm and a sheath wall thickness of 16.6 mm composed of an outer sheath and an inner sheath. The maximum wall thickness variation (greatest value minus smallest value) of the anti-resonance element preforms is less than 4 μm.

The following table lists the drawing parameters for different outer diameters before (BEFORE) and after (AFTER) the forming process (collapsing and elongation).

TABLE 1

| Outer diameter BEFORE [mm] | Outer diameter AFTER [mm] | Cladding tube length [mm] | Feed rate [mm/min] | Drawing [mm/min] |
|---|---|---|---|---|
| 90 | 70 | 1000 | 15 | 9.80 |
| 80 | 70 | 1000 | 15 | 4.59 |
| 40 | 20 | 1000 | 5 | 15 |
| 25 | 20 | 1000 | 10 | 5.63 |

The heating zone has a length of 100 mm. The maximum deviation of the wall thickness of the anti-resonance element preforms in the preform is about 4 μm in all exemplary embodiments. Anti-resonant hollow core fibers having an outer diameter of 200 μm or 230 mm, respectively, were drawn from the secondary preforms formed in this way in the collapse and elongation process, and the wall thicknesses of the antiresonance elements were determined.

In the fiber-drawing process, the secondary preform is in the case of a vertically oriented longitudinal axis fed from above into a temperature-controlled heating zone and softens therein zone by zone starting at the lower end. The heating zone is kept at a desired temperature of approximately 2100° C. with a control accuracy of +/−0.1° C. Temperature fluctuations in the hot-forming process can thereby be limited to less than +/−0.5° C. At the same time, gas is supplied to the core region (hollow core) so that an internal pressure of 4 mbar is established in the core region.

By means of the fiber drawing process guided in this way, an anti-resonant hollow core fiber with antiresonance elements embedded therein is obtained. After the fiber-drawing process, the fiber end is clean and free of deposits. This is attributed to the use of the quartz glass grade loaded with oxygen deficiency centers.

The device shown in FIG. 3 serves for the tool-free elongation of a starting cylinder 4 of undoped quartz glass loaded with oxygen deficiency centers to form an intermediate cylinder.

The outer wall of the starting cylinder 4 is coarsely ground by means of a peripheral grinder equipped with a #80 grinding stone, whereby the predetermined desired outer diameter is essentially obtained. The outer surface is then finely ground by means of an NC peripheral grinder. The inner surface of the tube thus obtained is honed as a whole by means of a honing machine equipped with a #80 honing stone, wherein the degree of smoothing is continuously refined, and final treatment is carried out with a #800 honing stone. The starting cylinder 4 is then briefly etched in a 30% hydrofluoric acid etching solution. In this way, a starting cylinder 4 with an outer diameter of 200 mm and an inner diameter of 70 mm is produced. This is then elongated in a device according to FIG. 2 to form an intermediate cylinder 12.

The device comprises a vertically oriented resistance heating tube 1 made of graphite, which encloses a heating chamber 3 that is circular in cross-section. The heating tube 1 consists of an annular element with an inner diameter of 240 mm, an outer diameter of 260 mm and a length of 200 mm. The heating tube 1 surrounds the actual heating zone. At each end it is extended by means of 55 mm wide extension pieces 5 made of graphite tubing, which have an inner diameter of 250 mm and an outer diameter of 280 mm. The internal volume of the heating zone Vc is approximately 8140 mm$^3$.

pyrometer 6, which detects the surface temperature of the starting cylinder 1, is arranged at the level of an upper detection plane E1 (at the upper edge of the upper extension piece 5). A further pyrometer 7, which detects the surface temperature of the elongated drawn tube 12, is arranged at the level of an lower detection plane E2 (at the lower edge of the lower extension piece 5). The temperature measurement values of the pyrometers 6 and 7 and the temperature of the heating tube 1 measured by the pyrometer 16 are each fed to a computer 8.

The upper end of the starting cylinder 4 is connected via a welded connection 9 to a quartz-glass holding tube 10, by means of which it can be shifted in the horizontal and vertical directions.

In the vertically oriented heating tube 1, the quartz glass starting cylinder 4 with an outer diameter of 200 mm and an inner diameter of 75 mm is adjusted in such a way that its longitudinal axis runs coaxially with the center axis 2 of the heating tube 1. The starting cylinder 4 is heated in the heating zone 3 to a temperature above 2200° C. and discharged at a predetermined rate of advance. From the forming drawing cone 11, the quartz glass drawn tube 12 is drawn at a regulated drawing speed to a nominal outer diameter of 27 mm and an inner diameter of 20 mm (wall thickness: 3.5 mm) as an intermediate cylinder. The continuous inner bore of the starting cylinder 4 and intermediate-cylinder drawn tube 12 has reference number 13. The tube drawing rate is detected by means of a discharge 15 and adjusted via the computer 8. The radial dimensions of the intermediate cylinder drawn tube correspond to those of the cladding tube 21 of FIG. 2.

The intermediate cylinder drawn tube 12 shows a smooth molten and particle-free surface. The cladding tube 21 is cut to length from it and, moreover, it is further processed into the ARE outer tube 24a. A drawn tube from which the ARE inner tube 24b is cut to length is drawn in the same way.

To accomplish this, in a second elongation step, it is used in a second drawing system as a starting cylinder for the production of ARE outer tubes or ARE inner tubes. The second drawing system used for this purpose is the same as the one in FIG. 3; differing essentially in the length and the inner diameter of its heating zone. The heating zone (the heating tube) has an inner diameter of 120 mm, an outer diameter of 140 mm and a length of 100 mm.

The invention claimed is:

1. A microstructured optical fiber which has a core region extending along a longitudinal axis of the microstructured optical fiber and an inner cladding region surrounding the core region, and through which hollow channels run, of which at least some are bordered by a wall material made of synthetic quartz glass which has a chlorine concentration of less than 300 ppm by weight, wherein the synthetic quartz glass of the wall material has oxygen deficiency centers at a concentration of at least $2\times10^{15}$ cm$^{-3}$.

2. The microstructured optical fiber according to claim 1, wherein the synthetic quartz glass has a concentration of oxygen deficiency centers of at least $5\times10^{15}$ cm$^{-3}$ better $1\times10^{16}$ cm$^{-3}$, and preferably at least $5\times10^{16}$ cm$^{-3}$.

3. The microstructured optical fiber according to claim 1, wherein the synthetic quartz glass contains oxygen deficiency centers at a concentration of at most $2\times10^{20}$ cm$^{-3}$, preferably at most $5\times10^{19}$ cm$^{-3}$, at most $1\times10^{19}$ cm$^{-3}$, at most $5\times10^{18}$ cm$^{-3}$, at most $2\times10^{18}$ cm$^{-3}$, at most $1\times10^{18}$ cm$^{-3}$, at most $5\times10^{17}$ cm$^{-3}$, at most $2\times10^{17}$ cm$^{-3}$ and particularly preferably at most $1\times10^{17}$ cm$^{-3}$.

4. The microstructured optical fiber according to claim 1, wherein the synthetic quartz glass has a hydroxyl group content of less than 10 ppm by weight, preferably less than 1 ppm by weight.

5. The microstructured optical fiber according to claim 4, wherein the synthetic quartz glass has a halogen content of less than 20 ppm by weight, preferably less than 10 ppm by weight.

6. The microstructured optical fiber according to claim 1, wherein the synthetic quartz glass contains foreign substances, except for carbon and nitrogen, at an overall concentration of less than 30 ppm by weight, preferably less than 3 ppm by weight.

7. The microstructured optical fiber according to claim 1, wherein the synthetic quartz glass has a viscosity at a temperature of 1200° C. of at least $10^{13}$ dPa s.

8. The microstructured optical fiber according to claim 1, wherein the core region has at least one hollow core, the inner cladding region comprises a microstructured regular arrangement of hollow channels extending in a longitudinal direction, and in that the inner cladding region is made of the wall material.

9. The microstructured optical fiber according to claim 1, wherein the core region has at least one hollow core, and the inner cladding region comprises hollow structural elements extending in a direction of the longitudinal axis of the microstructured optical fiber which are arranged annularly on the inner lateral surface of an inner cladding, and which guide light by an anti-resonance effect along the hollow core.

10. The microstructured optical fiber according to claim 9, wherein the hollow structural elements each comprise an anti-resonance element (ARE) outer capillary and at least one nested element (NE) inner capillary connected to an inner lateral surface of the ARE outer capillary, and in that the inner cladding, the ARE outer capillary and/or the at least one NE inner capillary are made from the wall material.

11. The microstructured optical fiber according to claim 9, wherein it comprises an outer cladding region surrounding the inner cladding region, which outer cladding region is made of the wall material.

12. A preform for producing a microstructure optical fiber according to claim 1, wherein the preform has a core region extending along a preform longitudinal axis and an inner cladding region surrounding the core region, and through which hollow channels run, of which at least some are bordered by a wall material made of synthetically produced quartz glass, which has a chlorine concentration of less than 300 ppm by weight and oxygen deficiency centers at a concentration of at least $2\times10^{15}$ cm$^{-3}$.

* * * * *